July 7, 1925.
T. K. WILSON
FRICTION RING FOR CLUTCH PARTS
Filed Sept. 6, 1922
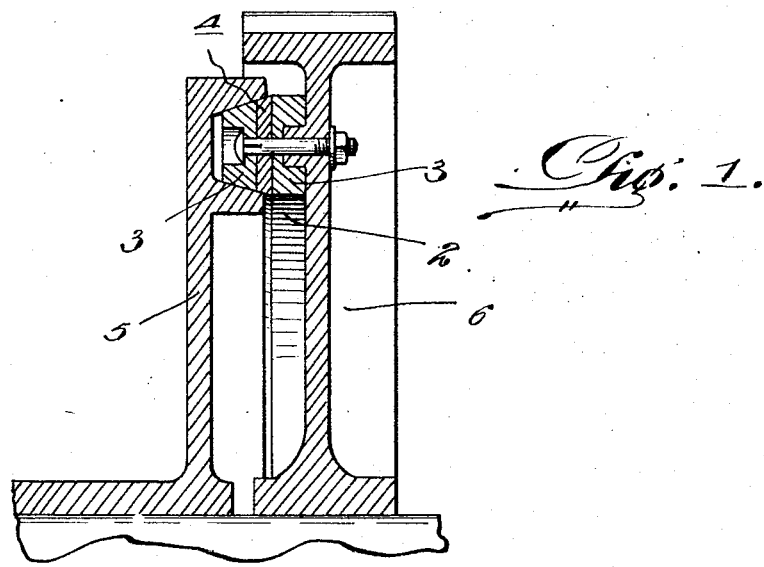
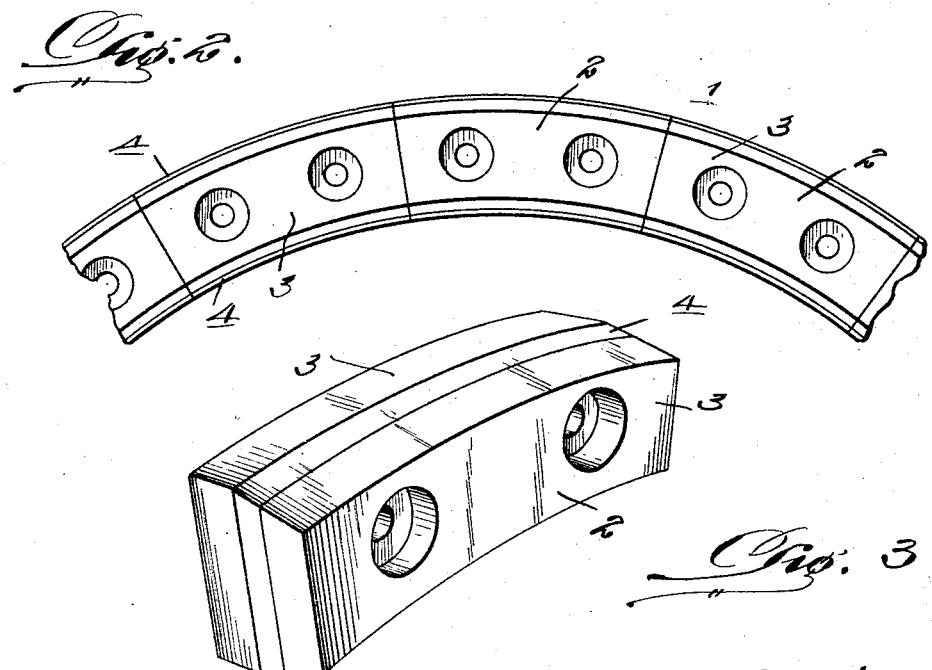
T. K. Wilson,
INVENTOR
BY Victor J. Evans
ATTORNEY
WITNESSES:

Patented July 7, 1925.

1,545,297

UNITED STATES PATENT OFFICE.

THOMAS K. WILSON, OF KERRY, OREGON.

FRICTION RING FOR CLUTCH PARTS.

Application filed September 6, 1922. Serial No. 586,427.

*To all whom it may concern:*

Be it known that I, THOMAS K. WILSON, a citizen of the United States, residing at Kerry, in the county of Columbia and State of Oregon, have invented new and useful Improvements in Friction Rings for Clutch Parts, of which the following is a specification.

This invention relates to a friction ring for clutch parts, the general object of the invention being to provide the ring with a center of fibre to increase the friction effect and also to lessen wear on the ring.

Another object of the invention is to form the rings in sections so that they can be easily and quickly installed.

The invention also consists in certain other features of construction and in the combination and arrangement of the several parts, to be hereinafter fully described, illustrated in the accompany drawings and specifically pointed out in the appended claims.

In describing my invention in detail, reference will be had to the accompanying drawings wherein like characters denote like or corresponding parts throughout the several views, and in which:—

Figure 1 is a view of a drum and gear showing my invention in use.

Figure 2 is a view of the ring alone.

Figure 3 is a view of one of the sections.

In these views, 1 indicates the ring which is composed of the sections 2, each section being formed of the outer pieces 3, which are preferably of wood, and the center piece 4, which is of fibre of any suitable material which has greater wearing qualities than wood. The pieces are bolted together and then dressed smooth, so that the finished ring is a laminated hole. The edge of the fibre forms a part of the friction surface of the device and it increases the gripping effect and lessens wear. By making the ring in sections it is easily installed between the drum 5 and the gear 6 without moving the drum.

It is thought from the foregoing description that the advantages and novel features of my invention will be readily apparent.

I desire it to be understood that I may make changes in the construction and in the combination and arrangement of the several parts, provided that such changes fall within the scope of the appended claims.

Having thus described my invention what I claim is:—

1. A clutch ring comprising a base portion and a tapered portion connected with the base portion, said tapered portion being formed of an outer part of wood and an inner part of fibre, the fibre part abutting the base.

2. A clutch ring formed of a plurality of sections, each section comprising a base part formed of wood and an outer tapered part formed of wood and fibre, the fibre being placed between the two wooden parts with the edges of the fibre part arranged to engage the surfaces to be gripped.

In testimony whereof I affix my signature.

THOMAS K. WILSON.